Figure 1:
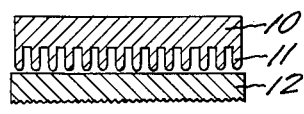

Jan. 31, 1956  R. G. RIEDESEL  2,733,181
SPLICED ABRASIVE BELT AND METHOD OF MAKING SAME
Filed Dec. 11, 1952

INVENTOR
Richard G. Riedesel
BY
Carpenter, Abbott, Coulter & Kinney
ATTORNEYS

United States Patent Office 2,733,181
Patented Jan. 31, 1956

2,733,181

SPLICED ABRASIVE BELT AND METHOD OF MAKING SAME

Richard G. Riedesel, Stillwater Township, Washington County, Minn., assignor to Minnesota Mining & Manufacturing Company, St. Paul, Minn., a corporation of Delaware Application December 11, 1952, Serial No. 325,434

19 Claims. (Cl. 154—116)

This invention relates to a method for splicing or joining together flexible sheet materials and to articles thereby produced. While the invention broadly encompasses the splicing of all kinds of flexible sheet material including treated and untreated fabrics and non-woven fibrous material, plastic films, leather, and many other analogous products, it has been found to be of particular utility in the manufacture of endless abrasive belts.

Among the objects of my invention are: to provide a method of splicing or joining together flexible sheet materials in a splice or joint capable of providing a tensile strength at least equal to the tensile strength of the sheet material; to provide a rapid and economical method of splicing together flexible sheet materials; to provide a method of forming a butt type splice by means of which high tensile strength as well as thickness and flexibility substantially identical with that of the flexible sheet material proper may be attained. More specific objects of my invention include the provision of a rapid, effective and economical method for splicing together abutting edges of abrasive-coated flexible sheet material in the manufacture of endless abrasive belts, bands, sleeves, cups, etc. having substantially uniform thickness, flexibility, and abrasive surface characteristics. The provision of equipment and components effective in applying these methods, and of structures and manufactures embodying splices and joints produced in accordance with these methods, is also included among the objects of my invention. Further objects and advantages will be pointed out, or will become apparent, as the description of the invention and the products thereof is carried forward.

The present invention accomplishes the foregoing objects in a novel and effective manner. It provides a simplified method for permanently splicing together adjoining edges of flexible sheet material with a joint or splice which may be made at least as high in tensile strength as the adjacent areas of, and substantially identical in degree of flexibility with the flexible sheet material, thus avoiding hinge bending and rapid failure at the joint. The splice area may also be made substantially identical in thickness with the remainder of the flexible sheet material, a factor which is particularly important in endless abrasive belts or bands.

The remarkable efficacy of the novel splice or joint prepared in accordance with the principles of this invention is demonstrated by the results of a typical test in which endless abrasive belts made from identical strips of abrasive-coated fabric belt stock by conventional prior art splicing methods and by means of the method of the present invention were compared.

In one case, the ends of the abrasive-coated strip were appropriately skived and were then adhesively bonded together in overlapping relationship under heat and pressure using a conventional thermosetting resinous adhesive. The resulting endless belt was operated on a belt-sanding machine, the belt being backed up by a flat platen, and tested by grinding steel test bars. When a bar was pressed against the moving belt it was observed to vibrate or mump excessively, due to the increased thickness and rigidity of the splice area. Bumping resulted in excessive wear of the belt in localized areas, and the belt therefore had to be discarded long before the abrasive-coated surface had become generally ineffective. Such bumping also produces cross-marks and other irregularities in the abraded surface, rather than a smooth uniform finish. Similar results are obtained generally with conventional adhesive-bonded lap splices. In addition, these splices tend to open up and fail when exposed to continued flexing around the pulleys of the sanding machine.

Another type of prior are splice, described in Miller and Riedesel Patent No. 2,391,731, has been found to be generally superior to the simple lap splice described above. It is made by pressing stranded material, such as wire screen, against the back of the abrasive-coated strip and across the abutted edges of the area to be spliced, so as to force the wires into the backing, where they are then adhesively bonded. Test belts prepared with wire screen of appropriate thickness from abrasive-coated strips having relatively thin backings and operated under favorable conditions were found to be strong and flexible, to produce a smooth finish on test pieces, to run without bothersome bumping, and to last for the full life of the abrasive coating. However when such belts were used over soft back-up wheels or without a supporting platen, or over small-diameter pulleys, the resulting severe deformation of the belt soon caused lifting of the edges of the wire screen and fatigue failure of the individual wires, so that the splice failed before the abrasive surface was fully exhausted.

When abrasive belts prepared with the novel splice or joint of the present invention were similarly tested, bumping and vibrating at the splice area was entirely eliminated, the entire abrasive coating was usefully exhausted, the splice remained intact throughout the life of the belt, and a smooth uniform finish was obtained on the work-pieces. This type of splice is applicable with abrasive-coated sheet material of all thicknesses normally required for such use, and the abrasive belts may be operated over soft back-up wheels and small diameter pulleys, and with or without supporting platens.

The practice of the invention will now be described, for purposes of explanation but not of limitation, in terms of the formation of a splice or joint in an abrasive-coated belt having an impregnated cloth base. It will be appreciated that the manufacture of the specific abrasive-coated strip here described forms no part of the present invention, and that other flexible abrasive-coated sheet materials may equally well be employed. Thus, paper, cloth, felted fibrous sheets, and various non-fibrous films may serve as the base. The fibrous materials may be impregnated or coated with water-soluble materials such as glue, with thermoplastic materials such as cellulosic derivatives, rubber compositions, plasticized vinyl resins, etc., or with thermosetting materials such as drying oil varnishes or phenolic resin compositions. Similarly, any of the known classes of abrasive binding and sizing materials or compositions may be employed, in bonding silicon carbide, aluminous oxide, or other abrasive grit to the flexible backing. Nevertheless the following specific example will be found helpful in providing a full, clear, concise and exact understanding of the principles of my invention.

*Example*

The abrasive-coated strip is prepared as follows:

Kier-boiled drills cloth having a thread count of 76 x 48 and weighing 48.5–52.5 grains/24 sq. in. is saturated with ethyl cellulose solution and dried, leaving 15–17 grains of the dry ethyl cellulose per 24 sq. in. The web is then coated on one side with a solution of heat-curing phenol-aldehyde resin sufficient to provide 12–15 grains of the dried resin per 24 sq. in. The sheet is heated in an oven at 150° F. for about one hour, until the resin just becomes tack-free. A phenol-aldehyde resinous grit-bonding coat is next applied, in the form of 14 grains per 24 sq. in. of a 70% solution in ethylene glycol monoethyl ether and water. The viscosity at 125° F. of the solution is 170–210 cps., and the solution is applied at an elevated temperature. Abrasive grit is sprinkled over the freshly coated surface, the excess is shaken off, and the sheet is further heated. In this instance the grit used is No. 180 silicon carbide, and a total weight of 42–46 grains per 24 sq. in. remains on the sheet. The bond is partly cured by heating for 40 minutes at 110° F., 40 minutes at 140° F., 80 minutes at 160° F., and 80 minutes at 185–195° F. A further "sandsize" coating of phenol-aldehyde resin is next applied in the amount of 22 grains per 24 sq. in. of a 66% solution having a viscosity of 100–120 cps., and the product is given a final cure of 4–6 hours at 205–215° F. followed by 5–7 hours at 240–250° F. The total weight of the completed sheet is 142–150 grains per 24 sq. in.

The coated and cured web is prepared for converting into endless abrasive belts by slitting into the desired widths and cutting to length. The ends of the strip may be cut at right angles to the length, but preferably are cut at matching angles of 45 degrees.

As a first step in the construction of the splice, the cut ends are butted firmly together and a die is forced into the filled fabric base from the grit-free side of the strip. A very effective form of die consists of a narrow flat-faced steel bar containing across the flat base a series of parallel grooves 0.075–0.080 inch deep and 0.023 inch wide, the area between grooves being 0.042 inch wide. Thus there are approximately 15–16 grooves and the same number of raised portions, or teeth, per inch of the die face. The parallel grooves and teeth are so positioned that, when the die is placed along the abutted ends of the abrasive strip, the teeth are parallel to the length of the strip. The tips and edges of the teeth are slightly rounded. The die is of such a length that it overlaps both sides of the belt.

Under sufficient pressure, the teeth of the die penetrate into the treated fabric web and form open channels at the abutted ends of the strip, by displacing the material of the web toward each side and into the grooves of the die face. The die is then removed. This operation provides a series of thick teeth and open channels in each of the abutting ends of the coated strip, parallel to the length of the belt and facing the corresponding teeth and channels of the opposite strip. The channels may extend through the entire thickness of the sheet, or may enter only to the extent of approximately one-half the thickness of the fabric backing, or may occupy any intermediate range, depending on the abrasive grit size and other factors. For the present example it is preferred to force the die through the entire fabric and through, or almost through, the abrasive coating.

There is then placed over the splice area a narrow strip of parallel-fiber-reinforced resinous adhesive film, cut and positioned so that the parallel fibers lie parallel to the open channels or slots formed by the die, and the splice is consolidated under heat and pressure. A typical adhesive film is formed as follows:

A carrier web is first provided consisting of a smooth-surfaced thin coating of polystyrene resin on a tough paper backing. A layer of a liquid resinous composition is next coated on the carrier web and dried at normal room temperature. The resinous composition consists of a blend of approximately equal weights of polyvinyl butyral resin, such as "Vinylite XYSG," and heat-advancing phenol-formaldehyde resin compatible therewith and having a phenol:formaldehyde molar ratio of 5:9, dissolved in ethylene glycol monoethyl ether to a solids content of 27–30%. The dried coating weighs 18–20 grains/24 sq. in.

After drying, the surface of the resinous film is temporarily re-moistened with methyl isobutyl ketone or ethylene glycol monoethyl ether, and a layer of parallel strands of fine glass filaments is pressed down onto the resinous surface while it is still sticky. There are 100 of these loose strands or yarns per inch of width of the resin film, and each yarn consists of 204 filaments or "ends," each of which is 0.00038 inch in diameter. The yarn has a loose S-twist of one turn per inch. A further coating of the resinous composition, sufficient to supply 14 grains of the dry resins per 24 sq. in., is then applied over the yarns, and the product is air-dried. It is next partially cured by heating in an oven for 45 minutes at 200° F. The resulting filament-reinforced resinous film can be stripped from the carrier web as a flexible, temporarily thermoplastic, heat-setting, reinforced self-supporting adhesive film. The filaments occupy a plane at approximately the mid-point of the thickness of the film.

As previously indicated, a narrow strip of the adhesive film is cut from the sheet thus formed, and placed over the abutting slotted ends of the abrasive-coated belt stock. The strip is cut to a size and in a direction such that it just covers the slotted splice area, with the short segments of filaments lying parallel to the teeth and slots formed by the die. The assembly is enclosed between the parallel heated platens of a press, and placed under pressure. During this entire operation, the portion of the carrier web associated with the adhesive film strip may be allowed to remain in place, where it prevents contact between adhesive and platen; or, as preferred, the carrier web may first be removed and the polished metal platen allowed to contact the adhesive film. Wider strips of carrier web have also been inserted to protect the metal platen; or the latter may be coated with a layer of wax or the like to prevent sticking of the resin. The electrically heated platens have a surface temperature of 350° F. For a 45-degree splice having a width of ½ inch in a 4-inch width belt, the pressure applied is four tons. Pressure is maintained for 15 seconds. During this time, the resinous film first softens and becomes plastic and adherent. The resinous material, under the pressure applied, flows down into the open channels in the ends of the abrasive-coated strip, and the glass filaments are carried into the channels by the flow of the plastic resin. The intense pressure flattens the tops of the thickened tooth portions of the strip. Continued heating then rapidly converts the liquefied heat-advancing resin mixture to the solidified thermo-set state. The resin mixture adheres strongly to the impregnated fabric material of the abrasive strip backing and to the glass filaments of the reinforcing yarns, and fills all voids in the structure. Most of the filaments lie well within the trough-like channels, where they are individually completely surrounded by the resin. The filaments are fully protected and contribute their full tensile strength to the structure. The joint has substantially the same flexibility and the same thickness as any other portion of the abrasive belt. While close inspection will usually reveal a narrow strip of resinous adhesive material along the center of the splice on the abrasive side, the two abutting ends of the strip are essentially in full contact and the abrasive grit coating extends substantially uniformly over the entire splice area.

As previously noted, an abrasive belt having such a splice operates with no observable bumping of the article being abraded, does not separate at the splice, and does not wear out locally but instead remains uniformly effective until substantially all of the abrasive-coated surface has been worn out.

Figure 2:
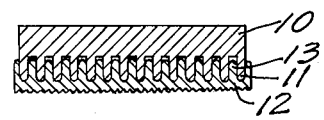
Figure 3:
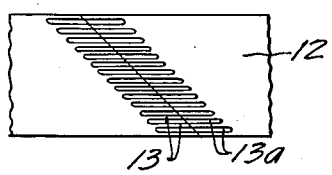
Figure 4:
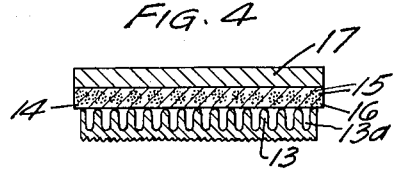
Figure 5:
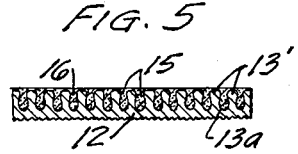
Figure 6:
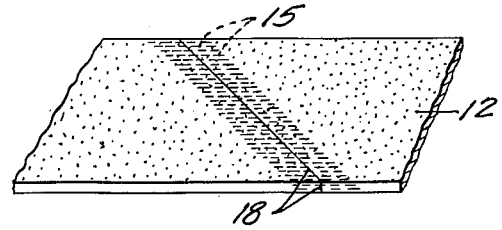
Figure 7:
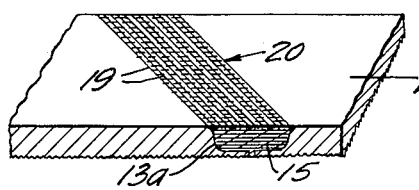
Figure 8:
Figure 9:
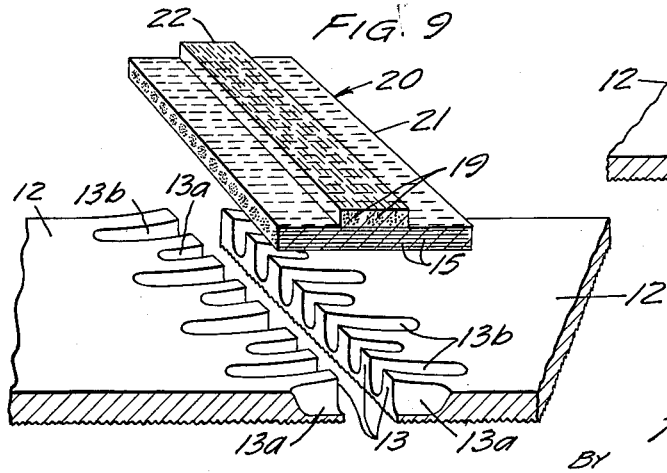
Figure 10:
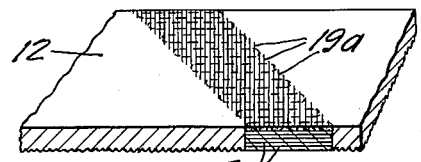

The nature of the procedure and the resultant product of this invention will be further apparent on consideration of the appended drawing, in which Figures 1, 2, and 4 are cross-sectional, and Figure 3 is a plan view showing successive steps during the preparation of the splice or joint illustrated in cross-section in Figure 5 and in perspective in Figure 6. Figures 7 and 10 are perspective views, partly in longitudinal section, of modifications of the splice of Figures 5 and 6. Figure 8 is a longitudinal section of a portion of a further modification. Figure 9 is an exploded view, in perspective, of a portion of an abrasive belt and a splicing-film just prior to the splicing operation. The several figures are not necessarily to scale but will serve to point out the nature of the steps involved, the equipment and materials employed, and the structures produced. Like numbers indicate generally the same or directly analogous elements in the several figures.

In Figure 1, the die 10, shown in cross-section, and designed as hereinbefore described, is placed against the uncoated back surface of the abrasive-coated strip 12, with the teeth 11 of the die lying parallel to the length of the strip 12 in the direction in which the abrasive belt is later to operate. Under usual conditions, this direction will be the direction of greatest stress to be applied to the abrasive belt. The die is then pressed into the strip as in Figure 2, also in cross-section, thereby opening channels in the material of the strip and forming raised portions 13 between the teeth of the die. These raised portions 13 retain their shape to a greater or less extent as the die 10 is withdrawn, and define open longitudinal channels 13a at the abutting edges of the strips which are to be spliced. Figure 3 is a plan view of the splice area of the abrasive belt with the die withdrawn, showing the open channels 13a parallel to the length of the belt and lying between the raised tooth portions 13. An adhesive film member 14 is then placed over these abutting edges as in Figure 4, again shown in cross-section. The film 14 contains filaments 15, loosely bundled in the form of yarns, in a supporting matrix of film-forming adhesive material 16. The filaments, appearing in cross-section, are positioned parallel to the direction of the open channels 13a between the raised portions 13 of the strips to be joined. A removable liner 17 may cover the exposed surface of the adhesive film 14. Pressure is then applied by means of heated platens, not shown. The adhesive material 16 softens under the influence of the elevated temperature and flows into the open channels, carrying with it the associated filaments 15, and then under brief continued heating cures or sets to a thermoset condition in which it is firmly and permanently adherently bonded both to the filaments and to the contacting surfaces of the sheet material. Under the continuing heat and pressure, the tips of the raised portions 13 are flattened and the entire splice area is compressed. The filaments are distributed throughout the resinous binder 16 in the partially closed channels 13a, as indicated in cross-section in Figure 5, which also shows the flattened and compressed tooth portions 13'. Any surplus of adhesive 16 flows out, under the influence of the heat and pressure, to fill all cracks or voids in the areas deformed by the die and to leave a thin section of adhesive between the two abutting ends of the spliced strips. The edge of this section is represented by line 18 of Figure 6, which shows in perspective, from the abrasive-coated side, the section of the completed abrasive belt containing the splice. In Figure 6 the position of the filaments connecting the two abutting ends of the abrasive-coated strip, and which are completely embedded in the resinous adhesive and in the strip itself, is indicated by short dotted lines 15, each such dotted line obviously representing a large number of filaments.

The tensile strength of the splice obviously depends on the number and strength of the individual filaments, and can be varied by increasing or reducing the number of filaments and by selecting filaments of different diameters and of different materials. A smaller number of larger filaments may, for example, provide the same tensile strength as the structure of the example, but with somewhat less flexibility. In all cases, the splicing filaments are much smaller in cross-section than the channels into which they are placed, and in the main will be found to lie well within such channels and substantially below the surface of the sheet material.

While wide splice areas are also useful, surprisingly narrow splice areas are found to provide fully adequate strength in the finished belt when using the principles herein described. In the example just given, the total width of the splice was one-half inch, hence the length of filament embedded in each of the abutting ends was only about one-quarter inch; yet the resulting abrasive belt in use did not fail either at the splice area or at areas adjacent the splice, but remained intact until substantially the entire abrasive coating had been exhausted. Even more remarkably, equally excellent results have been obtained with splices not more than about one-quarter inch in width, i. e. with only about one-eighth inch of filament length anchored in each of the two abutting ends of the abrasive-coated impregnated fabric strip. These splices are almost if not entirely impossible to detect during abrading and polishing operations. They cause no bumping and no marring of the work, and are so nearly identical in thickness and flexibility to the remainder of the belt that they present no indication of their presence as the belt is operated.

For most abrading operations, splices are desired which, like those just described, are equal in thickness and flexibility to the remainder of the belt. However, the present invention provides means of controlling these factors to any desired degree, and hence permits the production of splices or joints having greatly increased or decreased thickness or flexibility, where such structures are desired. Control of tensile properties is also provided.

Forming the longitudinal channels in the abutting edges is most conveniently and accurately accomplished as above described, namely, by placing the two ends of the strip in abutting relationship and then pressing a suitable die into both ends simultaneously. This operation has been successfully carried out by pressing in a hydraulic press, using a flat steel plate beneath the abrasive-coated surface. Particularly for heavier grits, a relatively soft and rubbery backing-up surface has given somewhat better results than the steel plate. The die has also been forced into the abrasive-coated strips by hammering. Tests in which the die was applied to the abrasive-coated rather than to the back surfaces of the belt stock produced entirely satisfactory splices, but the abrasive grit rapidly abraded and roughened the die and rendered it unfit for further use.

Splices have also been made by first making parallel and opposing cuts, in the edges to be abutted, with a knife or shears or by sawing. While these methods of slotting the abutting edges of the sheet material are obviously more time-consuming, useful abrasive belts have nevertheless been prepared by such procedures. Segments of abrasive-coated or other sheet material to be formed into belts are conveniently cut from a supply roll with a die provided with a central cutting edge, thus simultaneously cutting the strip and forming channels in the tail end of one segment and the head end of another segment. The channels may be formed in a continuous strip which is subsequently cut across the center of the channeled area.

A die which has been found suitable for use in the splicing of reasonably thin sheet material in accordance with the principles of my invention is made by supporting short parallel sections of steel spring wire against a flat steel plate. The wire may be welded or otherwise permanently attached to the face of the plate. The sections of wire form the equivalent of the teeth 11 of the die 10 of Figure 1. In such a structure, the ends of the short sections of wire—like the corresponding corners of the teeth 11 of Figure 1—are preferably sloped or rounded so as to provide a gradual pressing action rather than a cutting action at the closed ends of the slots or channels 13a. A similar effect is obtained by winding a continuous steel wire around a narrow steel strip or bar, the adjacent turns being separated by an appropriate distance. With thicker sheet material, a die having deeper grooves is required in order to provide space for the greater quantity of material displaced, and hence the die of Figure 1 of the drawing is more generally preferred.

The positioning of the splicing filaments within the cross-section of the flexible abrasive-coated web is important in obtaining the desired flexibility and strength in the completed splice. Placing the filaments at or too near the back or inner surface of the belt results in the abrasive-coated areas pulling apart as the splice passes over a pulley, and the resulting hinge action then frequently loosens or breaks the fibers. The loosened abrasive surfaces catch on the work and cause chattermarks or scratches, and may eventually snag and tear loose, thus ruining the belt. On the other hand, concentrating the filaments too near the abrasive-coated face is also undesirable, since much of the stress on the belt must then be passed to the grit-bonding layer rather than the fibrous backing. Preferred practice is therefore to place the filaments throughout as much of the splice cross-section as possible, with heaviest concentration being nearest the central plane of the fibrous backing in the case of abrasive-coated sheet materials.

Fully satisfactory splices have been produced, particularly in abrasive-coated belts and bands, by methods heretofore described and employing a single layer of bonded splicing filaments. Additional advantages have been obtained in my novel splice structures by incorporating a further layer of filaments 19, shown in Figure 7 of the drawing, lengthwise of the splice—i. e., crosswise or slantwise of the abrasive belt—and confined to the back surface of the web. Such a structure is conveniently prepared by placing a separate strip of the adhesive film, in which the yarns lie longitudinally, between the adhesive film 14 and the removable liner 17 of Figure 4. The extremely fine filaments 19 form a thin surface reinforcing layer over the splice area containing the splicing filaments 15 embedded in the channels 13a, one of which is here indicated in longitudinal cross-section. The over-all thickness of the splice normally remains the same as the thickness of the remainder of the belt. It is desirable to use stretchable crosswise filaments 19, since glass filaments as used for the splicing web 14 are less capable of withstanding the severe bending forces encountered by these longer sections of filament without breaking. Nylon filaments have been found particularly effective, and the adhesive film may be prepared by the same procedure employed for the glass-reinforced film. The filaments form a thin firmly bonded reinforcing layer 20 at the back surface of the splice. Abrasive belts spliced in this manner are particularly suitable for use on a soft back-up wheel or unsupported. Glass or other crosswise filaments are applicable, however.

The ends of the abrasive belt 12 are shown in Figures 3, 6 and 7 to be closely abutting, so that the abrasive coating is substantially continuous over the splice area. Figure 8 illustrates, in terms of a cross-section taken along one of the open channels 13a of Figure 4, a variation in which the edges to be spliced are slightly separated. The splicing filaments 15 lie across the open area, which is completely filled by the bonding resin 16.

Crosswise filaments may be employed, e. g. in the structure of Figure 8, at either surface. The filaments may be applied in separate strips, as described in connection with Figure 7. A more convenient method involves a combination splicing-strip having the short splicing filaments 15 and the long crosswise filaments 19 in different layers in a single resinous strip 20, as illustrated in perspective in Figure 9. The ends of the abrasive belt 12, containing open channels 13a and 13b bounded by raised tooth portions 13, are not closely abutted, but instead are slightly separated to leave an open area. The splicing film 20 includes a lower layer 21 containing the short splicing filaments 15 and an upper layer 22 containing the long reinforcing fibers 19, the two layers being adhered together or otherwise formed into a unitary strip with the two sets of filaments lying at a 45-degree angle to each other so that the short filaments 15 fit into the longitudinal channels 13a and 13b while the long filaments 19 lie parallel to the ends of the belt 12 in the completed splice. The layers 21 and 22 may be of the same width, although the structure illustrated, in which layer 22 is somewhat narrower than layer 21 and corresponds with the space between the ends of the belt, is ordinarily preferred. A second strip, not illustrated but generally similar to the layer 22, may be included on the other side of strip 21 if desired, the width of such second strip also desirably conforming to the width of the opening between the two ends of the belt 12.

Maintaining the resinous or other filament-reinforced adhesive strip 14 of Figure 4 or the multiple-layer strip 20 of Figure 9 accurately positioned on the abutting or adjacent channeled ends of the web which is to be spliced may be difficult during the period just prior to the hot-pressing operation. In such event a thin coating of a normally tacky and pressure-sensitive adhesive, e. g. of the rubber-resin type, applied to the appropriate surface of the adhesive strip, provides adequate temporary holding power.

Figure 9 also illustrates a structure in which the several open channels formed in the abutting ends of the belt are of different length. While the strip 21 might be given a corresponding edge shape, it is ordinarily sufficient to dimension such strip in accordance with the shortest of the channels 13a.

Figure 10 illustrates a variation of the structures of Figures 8 and 9, in which the splicing filaments 15 and the reinforcing filaments 19a are at right angles to each other, the spliced ends of the belt 12 being at 45 degrees to the length of the belt. Woven fabric may alternatively be employed as a reinforcing outer layer. In this figure, the position of the open channels initially formed in the ends of the abrasive belt is indicated by dotted outlines; however it will be understood that such channels are completely filled in the completed splice. Figure 10 illustrates a splice in which the slots or channels go completely through the sheet 12.

Nylon filaments, as well as cellulosic fibers and filaments, extremely fine piano wire, and many other natural and artificial fibers and filaments are useful in forming the splice. Glass filaments offer important advantages for abrasive belt splices in being substantially non-stretching and in having extremely high tensile strength, and are fully adequate in flexibility in the diameters employed. Each channel in the web to be spliced will receive a large number of such filaments, more than adequate to impart to the splice a tensile strength fully the equal of the remainder of the web; yet the filaments take up only a portion of the volume of the channels. Each filament is separately encased in the resinous bond, which additionally impregnates and strengthens the adjoining portions of the web and adhesively bonds the filaments thereto. Rather than being forcefully embedded in the flexible backing, as in the screen-reinforced splice, the filaments flow into the relatively large pre-cut slots or channels under hydraulic pressure in forming my novel splice structure, and hence they are not twisted, scratched or weakened in any way, but retain their full initial strength in the completed splice. For convenience in manufacture, the filaments are introduced in the form of loosely wound, open yarns; but individual filaments provide an equally useful structure.

The combination of polyvinyl butyral resin and compatible heat-setting phenol-formaldehyde resin described in the example in connection with the formation of the adhesive film has unique advantages in connection with the splicing of abrasive-coated belt stock as previously described. It adheres strongly to fabric and to glass filaments as well as to the heat-cured phenolic resin sub-size and grit bond. It is flexible when fully cured. It softens to a viscous fluid or plastic state when first heated, and then quickly sets to a flexible, tough, water-resistant and oil-resistant cured state on further heating. However the invention is not restricted to this particular adhesive composition. For splicing various types of flexible sheet material, other adhesive compositions have been found useful, and in some cases superior to the polyvinyl butyralphenolic resin combination. Combinations of rubberypolymers with phenol-aldehyde resins, polyester resin plasticizers with aminoaldehyde resins, and other analogous adhesive materials are fully operable with many types of flexible sheet materials. For structures not subsequently to be subjected to elevated temperatures, thermoplastic adhesives are also suitable; but such materials ordinarily are ineffective for use with abrasive belts which heat up during operation.

Adhesive materials which are thermoplastic in the presence of a volatile plasticizer are also useful; for example, strips of adhesive film consisting of glass filaments in a film of animal glue have been employed in making effective splices in glue-bonded abrasive-coated belt stock. The splicing film is first rendered temporarily thermoplastic by dipping in water or exposing to high humidity. Subsequent hot-pressing forces the glue and filaments into the prepared channels of the splice area and then volatilizes and removes the water, leaving a well-bonded splice or joint. Small amounts of glycerine or other permanent plasticizer or humectant may be incorporated in the glue film if desired, for improved flexibility.

Abrasive belts have herein been particularly referred to, but abrasive bands, cups, or any other structure involving the joining together at adjoining or abutting edges of sections of flexible and relatively thin sheet material by means of large numbers of short segments of very fine strong flexible filaments adherently bonded and independently embedded within pre-formed slots or channels in the abutting edge portions are contemplated as equally coming within the scope of the invention. Likewise the substitution, for the specific treated fabric backing herein described, of any alternative treated fabric or fibrous or non-fibrous film backing employed in the coated abrasives industry, or other analogous treated or untreated flexible sheet material, will be understood as coming within the ambit of my invention.

It will be understood that the term "abutting," as applied in the claims to the edges to be spliced or joined together, includes instances of direct edge contact as well as instances in which the adjoining edges are separated, as in Figure 8. However the term excludes overlapped edges. Furthermore it will be recognized that the direction of greatest stress in a belt or other structure may vary temporarily during use, but that the direction of stress to be applied to the splice as predetermined by the proposed application of the spliced article will govern the direction of the parallel slots and the splicing filaments. Thus an abrasive sleeve suitable for use on a drum sander may be formed of a plurality of narrow strips, each of which has its two ends joined with a splice formed with slots and filaments parallel to the length of the strip, and having the adjacent sides of the several strips joined with a splice formed with slots and filaments parallel to the axis of the sleeve. Analogously, an annular ring may be joined to a circular disc by forming the required slots or channels in the abutting edges along radial lines, and employing an annular, radially reinforced ring of adhesive film material or, preferably, a circularly disposed strip of reinforced adhesive film having initially parallel filaments.

I claim:

1. The method of splicing together abutting edges of flexible sheet material comprising: slotting said sheet material at said edges at an angle to the edge and parallel to the direction of stress to be applied to the splice; holding said edges in abutting relationship and inserting within the slots and across the abutting edges a plurality of flexible, strong, fine filaments; and firmly adherently bonding said filaments within said slots.

2. The method of splicing together abutting edges of flexible sheet material comprising: slotting said sheet material at said edges to form a plurality of open slots at said edges at an angle with the edge and parallel to the direction of stress to be applied to the splice; holding said edges in abutting relationship and inserting within said open slots and across the abutting edges a plurality of flexible, strong, fine filaments; and firmly adherently bonding said filaments within said slots.

3. The method of splicing together abutting edges of flexible sheet material comprising: slotting said sheet material at said edges to form a plurality of open slots at said edges at an angle with the edge and parallel to the direction of stress to be applied to the splice; holding said edges in abutting relationship and placing along said edges a narrow section of at least temporarily softenable adhesive film containing a layer of parallel, flexible, strong, fine filaments, the film being positioned so that said filaments lie parallel to and generally above said open slots; temporarily softening the adhesive film, and flowing the filaments, together with the temporarily softened adhesive material of said adhesive film, into said open slots and across said abutting edges; and hardening the adhesive to form a strong flexible filament-reinforced splice.

4. The method of splicing together abutting edges of flexible sheet material comprising: slotting said sheet material at said edges to form a plurality of open parallel slots of a depth equal to at least about one-half of the thickness of the sheet material and extending parallel to the direction of stress to be applied to the splice; holding said edges in abutting relationship and placing along said edges a narrow section of at least temporarily heat-softening adhesive film containing a layer of parallel, flexible, strong, fine filaments, the film being positioned so that said filaments lie parallel to and generally above said open slots; hot-pressing said adhesive film and the filaments contained therein into said open slots; and hardening the adhesive to form a strong flexible filament-reinforced splice.

5. The method of splicing together abutting edges of abrasive coated sheet material comprising a flexible backing and a layer of abrasive grits adhesively bonded to one surface of said backing, which includes the steps of: slotting said sheet material at said edges, from the side opposite the layer of abrasive grits and to a depth of at least about one-half the thickness of said flexible backing to provide a plurality of open parallel slots in said backing at said edges and parallel to the direction of stress to be applied to the splice; holding the slotted edges in abutting relationship and inserting within the slots and across the abutting edges a plurality of flexible, strong, fine filaments; and firmly adherently bonding said filaments within said slots.

6. The method of splicing together abutting edges of abrasive coated sheet material comprising a flexible backing and a layer of abrasive grits adhesively bonded to one surface of said backing, which includes the steps of: slotting said sheet material at said edges, from the side opposite the layer of abrasive grits and to a depth of at least about one-half the thickness of said flexible backing to provide a plurality of open opposing parallel slots in said backing at the abutting edges and parallel to the direction of stress to be applied to the splice;

holding the slotted edges in abutting relationship and placing over the slotted area a section of at least temporarily heat-softening adhesive film containing a layer of flexible, strong, fine filaments, the film being positioned so that said filaments lie parallel to and generally above said open slots and across said abutting edges; hot-pressing the assembly so as temporarily to soften the adhesive, to force the softened adhesive and the filaments associated therewith into the said open slots, and to compact said assembly to a thickness substantially identical with that of said abrasive coated sheet material; and hardening the adhesive to form a strong flexible filament-reinforced splice.

7. The method of claim 6 in which the adhesive film is rapidly thermosetting and the hardening step is accomplished by continuing the hot-pressing for a time sufficient to cure the adhesive to the flexible thermoset state.

8. The method of claim 7 in which the adhesive film is a blend of polyvinyl butyral resin and thermosetting phenolformaldehyde resin.

9. An article comprising flexible sheet material having two adjacent edges, said edges being spliced together in the plane of the sheet material by a plurality of flexible, strong, fine filaments inserted within open-ended slots previously provided at said edges, said slots being at an angle to the edge and parallel to the direction of stress to be applied to the splice, said filaments lying across the adjacent edges and being firmly adherently bonded within said slots.

10. The article of claim 9 in which the two adjacent edges are closely abutting.

11. The article of claim 9 in which the two adjacent edges are separated.

12. An abrasive article of flexible abrasive-coated sheet material comprising a flexible backing and a layer of abrasive grits adhesively bonded to a surface thereof, and having a joint formed by two adjacent edges of said sheet material spliced together in the plane of the sheet material by a plurality of flexible, strong, fine filaments inserted within open-ended slots previously provided at said edges, said slots being at an angle to the edge and parallel to the direction of stress to be applied to the splice, said filaments lying across the adjacent edges and being embedded and firmly adherently bonded within said slots.

13. The article of claim 12 in which the slots are open at the grit-free surface of the flexible backing and extend to a depth of at least about one-half the thickness of said backing.

14. The article of claim 13 in which the filaments are bonded within said slots by a flexible, thermoset, rapidly thermosetting adhesive.

15. The article of claim 14 in which the filaments are embedded throughout substantially the entire thickness of the flexible backing.

16. The article of claim 15 in which the filaments are glass filaments.

17. The article of claim 12 having additional reinforcing filaments adherently bonded to the surface of the sheet material overlying the splice and not parallel to the direction of stress.

18. The article of claim 12 in which the two adjacent edges of the sheet material are closely abutting.

19. The article of claim 12 in which the two adjacent edges of the sheet material are separated.

References Cited in the file of this patent

UNITED STATES PATENTS

| | | |
|---|---|---|
| 1,728,673 | Driver | Sept. 17, 1929 |
| 2,330,855 | Woolf | Oct. 5, 1943 |
| 2,391,731 | Miller et al. | Dec. 25, 1945 |